June 30, 1970    T. M. BLEAK ET AL    3,518,179
TEMPERATURE COMPENSATED ELECTROCHEMICAL CELL
Filed March 11, 1968

*INVENTOR.*
JOE A. PORTER
BY   THOMAS M. BLEAK

JOSEPH H. GOLANT
ATTORNEY

United States Patent Office 3,518,179
Patented June 30, 1970

3,518,179
TEMPERATURE COMPENSATED ELECTROCHEMICAL CELL
Thomas M. Bleak, Buena Park, and Joe A. Porter, Whittier, Calif., assignors to Beckman Instruments, Inc., a corporation of California
Filed Mar. 11, 1968, Ser. No. 712,264
Int. Cl. G01n 27/54, 27/46
U.S. Cl. 204—195                                   1 Claim

ABSTRACT OF THE DISCLOSURE

The specification discloses a temperature sensing element such as a thermistor attached to or located immediately adjacent one of the electrode elements of a polarographic cell for indication of membrane temperature. The temperature sensing element may be directly bonded to the electrode or disposed within a thermally conductive tube or U-bracket which is attached to the electrode.

BACKGROUND OF THE INVENTION

Field of the invention

This invention relates generally to electrochemical cells for measuring a constituent in a sample medium and more particularly to improvement in those classes of cells generally referred to as polarographic cells which enable temperature compensation to be made of the measurements taken.

Description of the prior art

Electrochemical cells of the type to which this invention pertains generally comprise a pair of electrodes joined by an electrolyte and separated from the sample medium to be analyzed by means of a membrane that is permeable to a constituent in the sample but is not permeable to the electrolyte. Such a cell is described in detail in U.S. Pat. No. 2,913,386. Generally cells of this type are referred to as polarographic cells. In these cells a suitable voltage difference is developed across the pair of electrodes, and, in the absence of the constituent to be analyzed in the sample, the electrode system becomes polarized so that a current which normally flows through the electrolyte is reduced to nearly zero after a short period of time.

If the sample contains the constituent to be analyzed, the electrode system becomes depolarized as the constituent passes through the membrane and the current again flows. The magnitude of the current is a function of the rate or speed with which the constituent to be analyzed passes through the membrane and of the diffusion process that takes place through the film of electrolyte in the immediate vicinity of the sensing electrode adjacent the membrane. As the constituent to be analyzed has to pass through the membrane and diffuse through the electrolyte film disposed between the membrane and the electrode, the environmental condition existing at this location is of extreme importance.

Plastics, such as Du Pont "Teflon" plastic, have become widely utilized as the membrane material when the cell is used as an oxygen measuring device. However, it has been found that the rate or speed of passage through the "Teflon" plastic membrane is related to the temperature of the membrane. In order to secure more accurate measurements when working with a sample or in an environment having a variable temperature, various means have been devised in an effort to provide temperature compensation for the sensing cell. One such attempt comprised the placement of a thermistor in the sample medium flow path. Another attempt comprised burying the thermistor in the body of the cell. Both of these techniques have shortcomings in that the need for temperature compensation is primarily due to the change in temperature across the membrane and not that of the surrounding sample medium or of the body of the cell. When the thermistor is somewhat remotely located from the membrane, accurate temperature compensation is not achieved except under equilibrium conditions in that the temperature changes sensed by these temperature compensating elements are not the temperature changes of the membrane as is desired and necessary for accurate compensation.

OBJECTS

Thus what is needed and constitutes a principal object of the present invention is an improved means for detecting the temperature of the membrane in an electrochemical cell.

Another object of the invention is to provide an electrochemical cell incorporating a temperature sensing element which is simple, reliable, inexpensive and adaptable to be located very near the membrane.

Still another object of the invention is to provide an electrochemical cell capable of giving accurate and responsive indications of temperature variations of the membrane.

DESCRIPTION OF THE PREFERRED EMBODIMENTS

Figure 1:
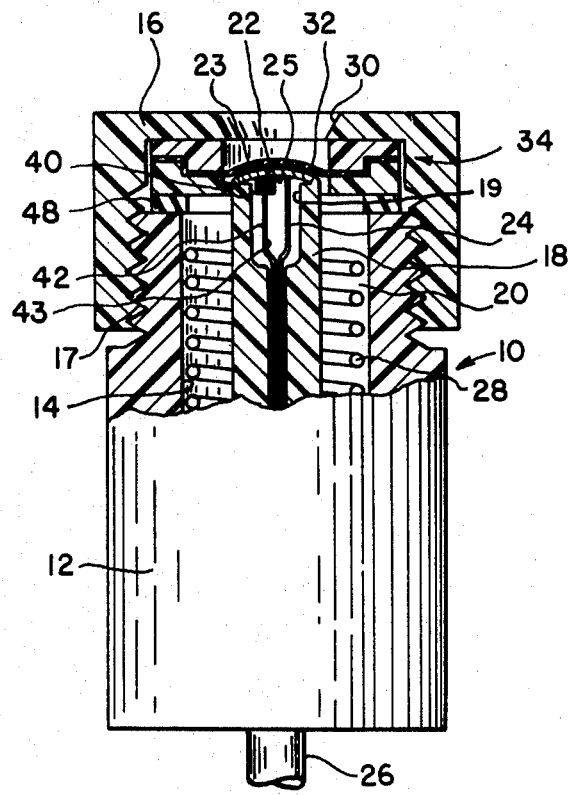
FIG. 1 is a longitudinal partial sectional view of a polarographic cell incorporating the novel features of the invention.

Referring now to the drawing there is illustrated in FIG. 1 a cell generally designated by the numeral 10, comprising a non-electrically conductive cylindrical body 12 having a recess 14 in one end thereof which is closed by a cap 16 threaded to the body at 17. The body 12 includes a central portion 18 which is spaced from the wall of the recess 14 to provide an annular electrolyte reservoir 20. The end of the element 18 terminates adjacent the cap 16. A cavity 19 opens at the end of the element 18. A thermally conductive relatively thin electrode element 22 having an outer surface 23 and an inner surface 25 closes the cavity 19. A conductor 24 extends longitudinally within the central portion 18 and connects the inner surface 25 of electrode 22 to a connecting lead in cable 26. The second electrode 28 of the cell may be in the form of a helical wire positioned within the reservoir 20 about the center portion 18 and having one end connected to another connecting lead in cable 26. It is noted that the second electrode may be in the form of a coiled metal sheet if so desired. The cable 26 includes an appropriate electrical terminal (not shown) as is well known in the art for connection to appropriate circuitry (not shown).

The cap 16 has a central passage 30 therein aligned with the electrode 22. A membrane 32 which is selectively permeable to the constituent to be analyzed and substantially impermeable to the electrolyte, such as polyethylene or "Teflon" plastic when the constituent is oxygen, is mounted in and positioned by a membrane holding assembly 34, comprised of two mating annular elements as described more fully in copending application Ser. No. 590,900 assigned to the assignee of the present application. The assembly 34 is positioned between the body 12 and the cap 16 so that the membrane is stretched over the end of the element 18 and the electrode 22 to define therebetween an electrolyte film space (exaggerated in size in FIG. 1) which is in communication with the electrolyte reservoir 20. Connected to the inner surface 25 of the electrode 22 is a temperature sensing element 40, such as a thermister, which may be connected to third and fourth connecting leads in cable 26 by conductors 42 and 43. Spaced between the membrane holding assembly 34 and the body 12 may be an elastomeric annular seal 48 which is compressed by tightening cap 16 to prevent leakage of electrolyte beyond the membrane holding assembly 34.

Figure 2:
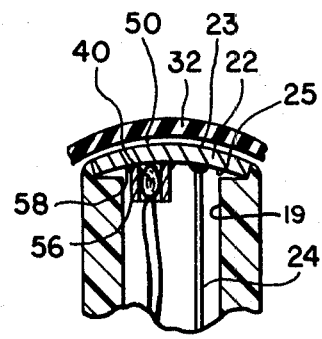
FIG. 2 is an enlarged partial view of the embodiment shown in FIG. 1.
Figure 4:
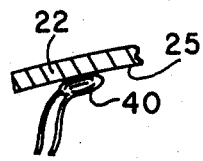
FIG. 4 is an enlarged partial view of FIG. 1 illustrating still another embodiment of the temperature sensing element mounted within the cell.
Figure 3:
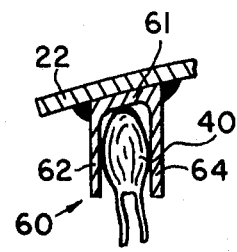
FIG. 3 is an enlarged partial view of FIG. 1 illustrating another embodiment for mounting the temperature sensing element.

Referring now to FIGS. 2, 3 and 4 there is shown in detail the temperature sensing element 40 and the electrode element 22. As already discussed the "Teflon" plastic membrane 32 is placed over the electrode element 22 so as to effectively cover the recessed area 14 while a spacing, designated 50, between the membrane 32 and the outer surface 23 of the electrode element is provided for communicating the electrode element 22 with a suitable electrolyte in the reservoir 20 and thereby the electrode 28. Since the membrane is stretched over the electrode element 22, the spacing 50 has been greatly exaggerated in FIG. 2. Connected to the inner surface 25 of the electrode element 22 is the temperature sensing element 40 which may be held in thermal contact with the electrode element simply by an epoxy or cement physically attaching the element 40 to the electrode 22 as shown in FIG. 4. As used herein the terms "thermal contact," "thermal connection" or "thermally connected" simply means that thermal energy is easily conducted from one of the elements to the other. Therefore, if the temperature sensing element is directly bonded to the electrode element 22, thermal energy is directly transmitted from the electrode to the temperature sensing element and through the bonding agent to the temperature sensing element. The bonding agent is preferably a good conductor of thermal energy. It has been found that the temperature of the electrode element 22 is very close to that of the membrane 32 since they are very closely spaced, and that the temperature of the electrode sensed by the temperature sensing element is sufficiently accurate to allow temperature compensation for the change in permeability of the membrane as a function of the change in temperature of the membrane.

However, to facilitate quicker response and even more accurate determination of temperature a metallic tube 56, FIG. 2, may be connected to the electrode by any suitable means such as by brazing or soldering (as designated by the numeral 58). The tube is of sufficient diameter to snugly receive the temperature sensing element 40. It may be necessary to add a bonding agent within the tubing to rigidly mount and position the sensing element. The metal tube 56 substantially surrounds the sensing element with a thermally conductive surface at substantially the same temperature throughout. It is to be understood that under some circumstances it may be desirable to use two or more temperature sensing elements; in such case the sensing elements may be located in the space presently showing only one such element.

Another embodiment for mounting and positioning the temperature sensing element comprises a metallic U-shaped bracket 60, FIG. 3, suitably connected at its base 61 to the electrode 22 and adapted to receive the sensing element 40 between its two legs 62 and 64. The lateral edges (not shown) of the U-bracket may be pinched so that the U-bracket substantially encloses the sensing element. A bonding agent may also be used to rigidly position the element within the U-bracket. As with the tubular conductive element, thermal energy is transferred from the electrode through the U-bracket to the temperature sensing element.

OPERATION

When the cell 10 is used for the polarographic measurement of oxygen, the electrode element 22 is a cathode and may be formed of gold or other noble metal, the electrode 28 is an anode and may be formed of silver and the electrolyte may then suitably be potassium chloride solution. As is well known in the art, a suitable polarizing potential is impressed across the electrodes from an external circuit (not shown) so that when oxygen passes through the membrane 32 into the electrolyte film space 50 adjacent to the electrode element 22 the oxygen is reduced at the electrode 22 causing a current flow between the electrodes. The current that is produced is indicative of the oxygen content of the sample medium being analyzed. Also as is well known in the art, the external voltage source may be eliminated if the electrodes are formed of materials which produce an electromotive potential thereacross of proper magnitude. For example, the electrode 22 may be of gold, silver or other noble metal, the electrode 28 of zinc, cadmium or lead and the electrolyte of potassium hydroxide solution.

During the passing of oxygen through the membrane 32 any temperature variations in the sample medium or cell environment may cause the membrane to pass a greater or lesser amount of oxygen which may cause misleading measurements to be indicated. By positioning the temperature sensing element 40 against the inner surface 25 of the electrode 22 or within the metallic tube 56 or U-bracket 60, the temperature of the sensing element very closely approaches the temperature of the electrode and thereby the temperature of the adjacent membrane. In addition the spatial closeness of the membrane to the electrode 22 enables quick response by the temperature sensing element to variations in temperature. It is also apparent that changes in temperature of the medium being monitored will be sensed primarily as they affect the membrane.

Temperature compensation using the invention herein disclosed may also be applied when measuring gases other than oxygen. For example, hydrogen sensors and $CO_2$ cells which depend upon gas diffusion through a membrane may be constructed in an analogous manner to that disclosed above.

It is to be understood that while a limited number of embodiments have been disclosed herein for purposes of illuustration, various modifications and variations may be made therein without departing from the scope of the invention as defined by the appended claim.

We claim:
1. A temperature compensated electrochemical cell for determination of a constituent in a sample comprising:
   body means having a a central portion formed with a cavity therein opening at one end thereof;
   first and second spaced electrodes mounted in said body means and adapted to be joined by an electrolyte;
   said first electrode being a relatively thin disc mounted at said one end of said central portion so as to close said cavity, said first electrode having an inner surface facing said cavity and an opposite outer surface;

a membrane permeable to said constituent but impermeable to the electrolyte positioned to separate said electrodes and electrolyte from the sample, said membrane overlying said outer surface of said first electrode; and temperature sensing means in said cavity positioned immediately behind said first electrode and being thermally connected to said inner surface thereof.

References Cited

UNITED STATES PATENTS

| | | | |
|---|---|---|---|
| 3,235,477 | 2/1966 | Keyser et al. | 204—195 |
| 3,322,662 | 5/1967 | Mackereth | 204—195 |

TA-HSUNG TUNG, Primary Examiner